United States Patent [19]

Milanowski

[11] Patent Number: 4,871,292

[45] Date of Patent: Oct. 3, 1989

[54] SYSTEM FOR ATTACHING AND LOCKING MATERIAL HANDLING TOOLS TO A DIPPER BOOM

[76] Inventor: Richard Milanowski, 3105 Martin Rd., Mosinee, Wis. 54455

[21] Appl. No.: 134,059

[22] Filed: Dec. 17, 1987

[51] Int. Cl.$^4$ .............................................. E02F 3/28
[52] U.S. Cl. .................................. 414/723; 172/272; 403/3; 403/316; 403/374
[58] Field of Search ............... 414/723, 703, 912, 920; 403/316, 317, 374, 3, 4; 172/272-274, 275; 37/231, DIG. 3

[56] References Cited

U.S. PATENT DOCUMENTS

| | | |
|---|---|---|
| 3,606,052 | 7/1969 | Schurz . |
| 3,666,124 | 5/1972 | Arnold . |
| 3,767,070 | 10/1973 | Arnold . |
| 3,854,608 | 12/1974 | Arnold . |
| 3,887,096 | 6/1975 | Wieland ............................ 414/723 |
| 3,934,738 | 1/1976 | Arnold . |
| 3,985,249 | 10/1976 | Aker et al. . |
| 4,127,203 | 11/1978 | Arnold . |
| 4,187,050 | 2/1980 | Barbee . |
| 4,214,840 | 7/1980 | Beales . |
| 4,243,356 | 1/1981 | Takojima . |
| 4,253,793 | 3/1981 | Braml . |
| 4,279,085 | 7/1981 | Arnold . |
| 4,295,287 | 10/1981 | Natzke et al. . |
| 4,311,428 | 1/1982 | Arnold . |
| 4,345,872 | 8/1982 | Arnold . |
| 4,457,085 | 7/1984 | Arnold . |
| 4,531,883 | 7/1985 | Arnold . |
| 4,643,631 | 2/1987 | Maurer et al. ................... 414/723 |
| 4,674,945 | 6/1987 | Hulden ............................. 414/723 |

OTHER PUBLICATIONS

Quick-Latch for the Case 580, a brochure by Central Fabricators, Inc., Box 96, Rothschild, Wisconsin, 54474.
Case Product News Excavators, Jun., 1983, "New Bucket Quick Latch for the 1285 Cruz-Air, 1080 Crawler".
Central Fabricators, Inc. "Quick-Latch".
Allied Equipment Engineering Installation Approval drawing.
The assembly drawing identified as SK4 and SK5.

Primary Examiner—Robert J. Spar
Assistant Examiner—Donald W. Underwood
Attorney, Agent, or Firm—Burns, Doane, Swecker & Mathis

[57] ABSTRACT

A system for attaching a material handling tool to an arm of an excavating device includes a forward hook for engaging with a pin on the material handling tool and a rearward latch mechanism for engaging with a rearward fixture on the material handling tool. The rearward latch mechanism uses a rotating pin to lock the latch mechanism. By uniformly spacing the latch mechanism from the forward hook, and by also including a second latch mechanism, spaced from the rearward latch mechanism, a versatile standardized attachment device is created.

28 Claims, 6 Drawing Sheets

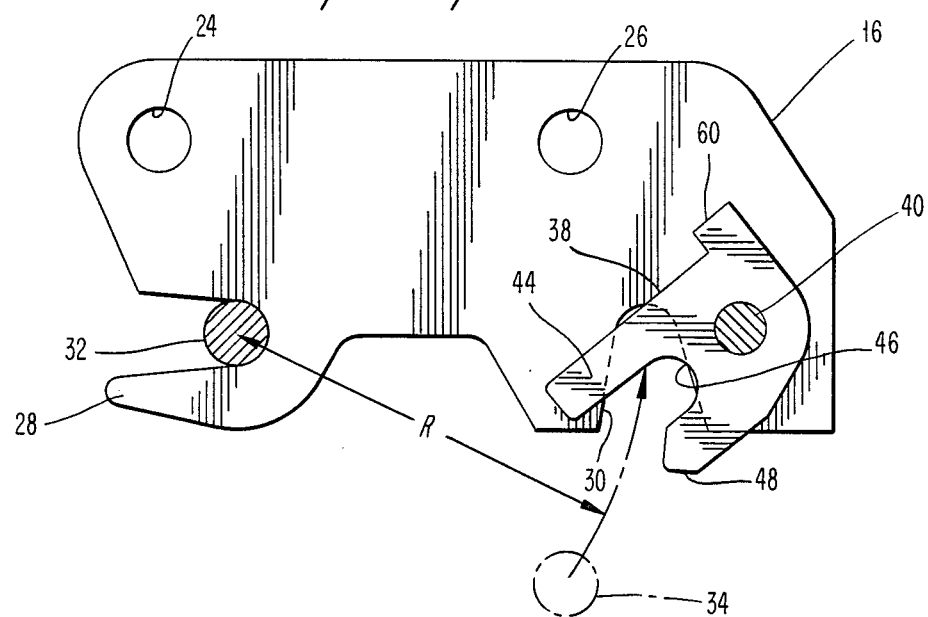
Fig. 4
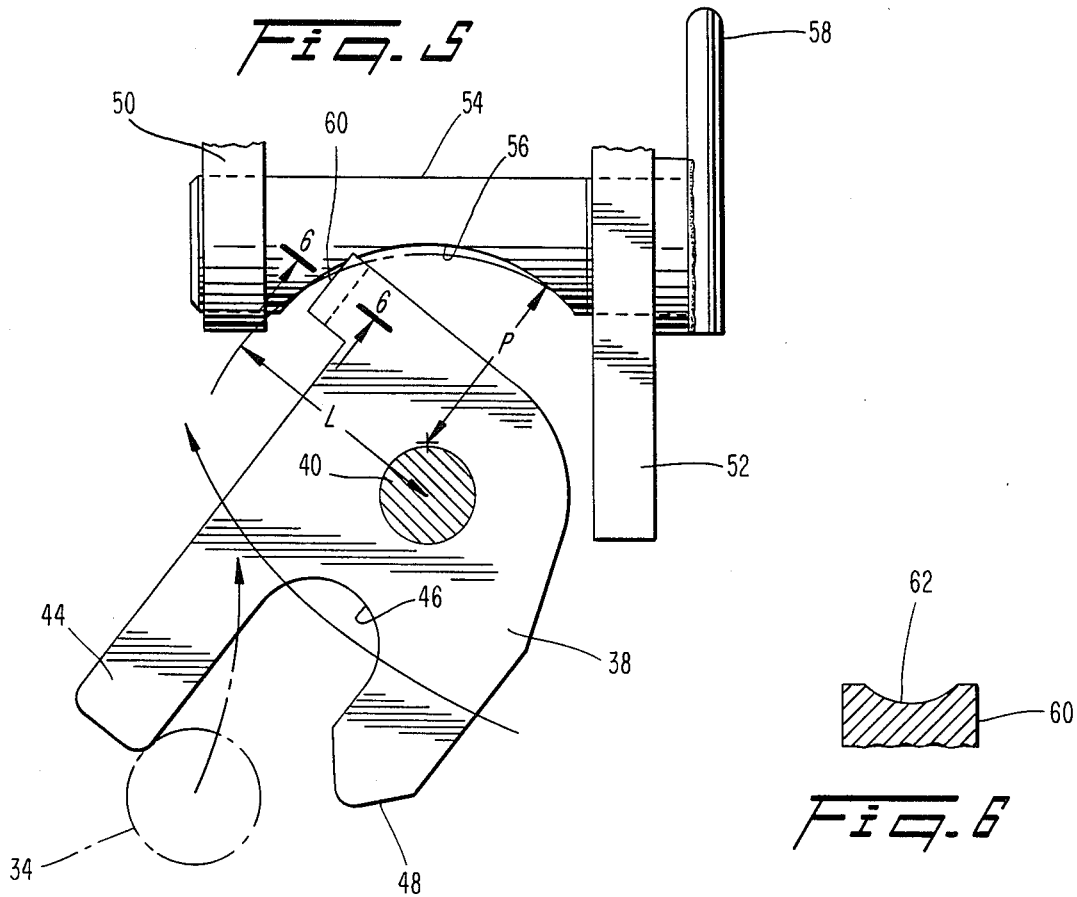
Fig. 5
Fig. 6

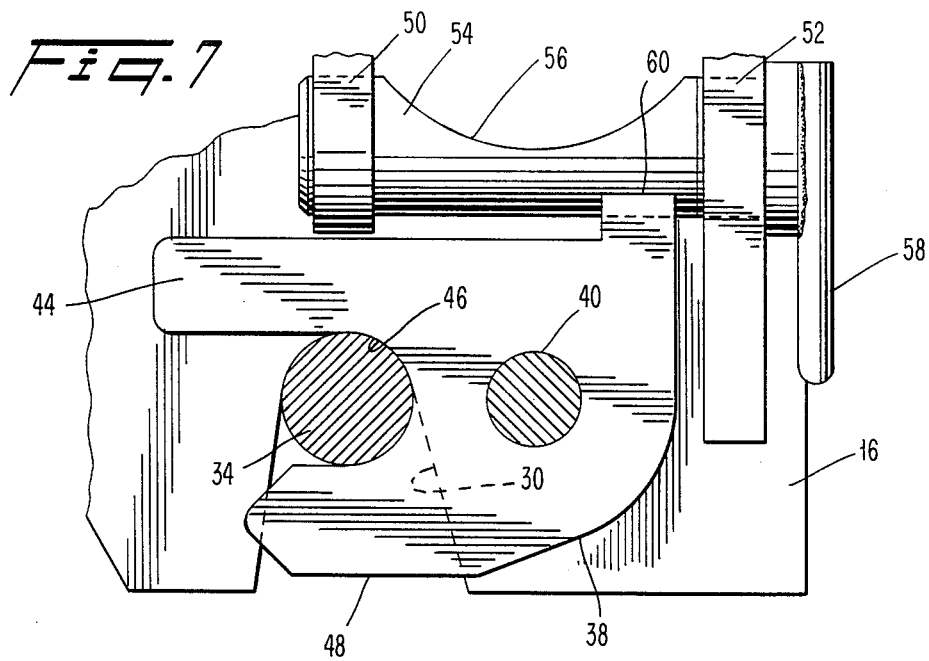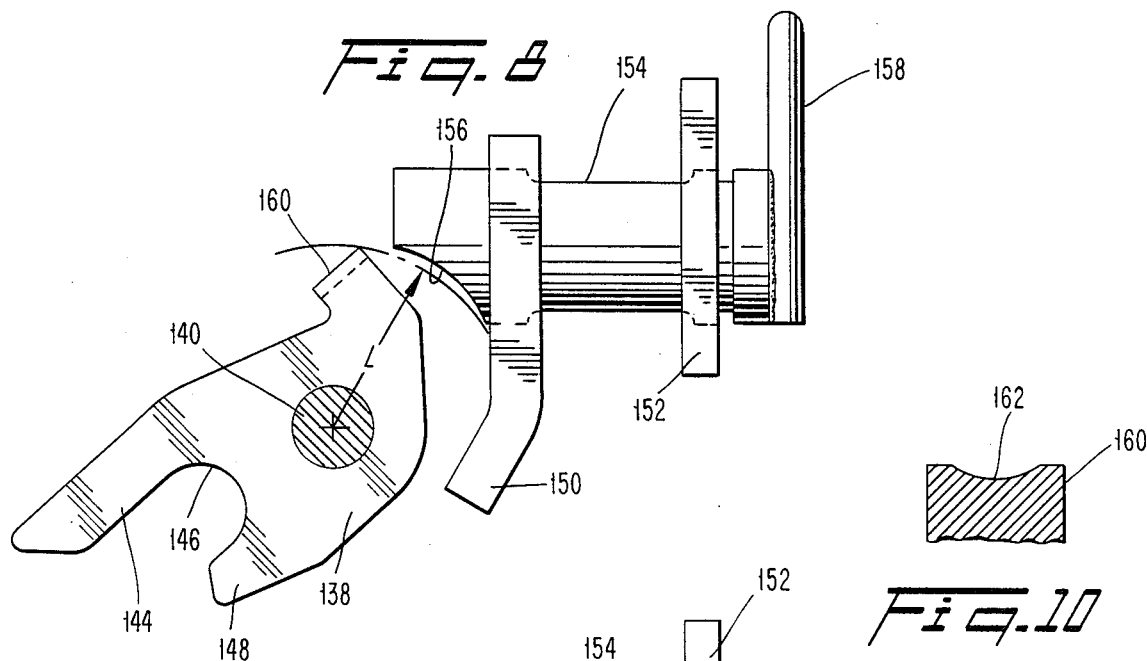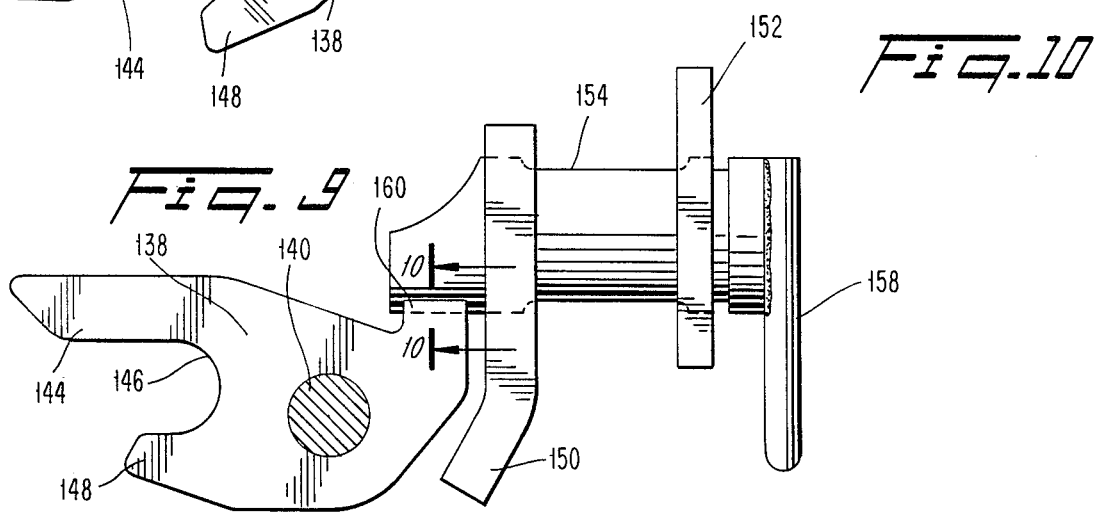

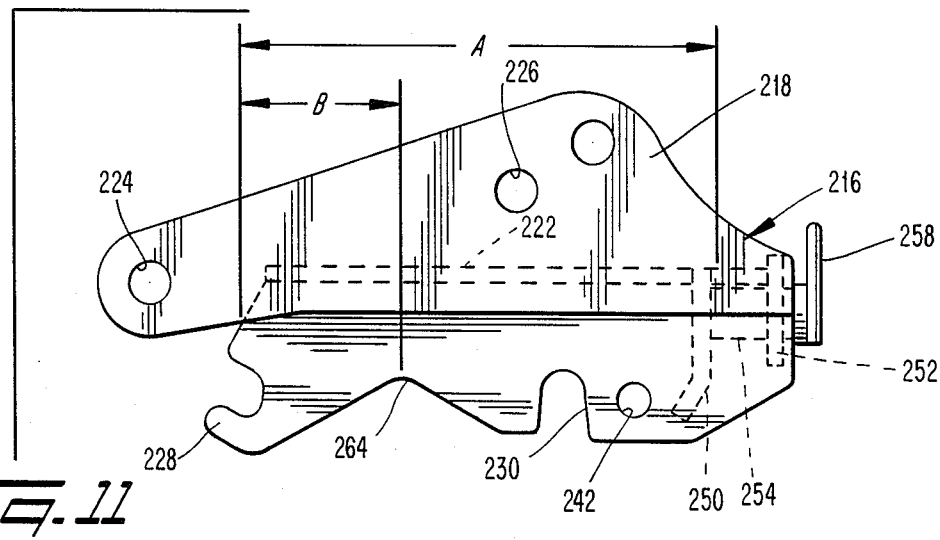
Fig. 11
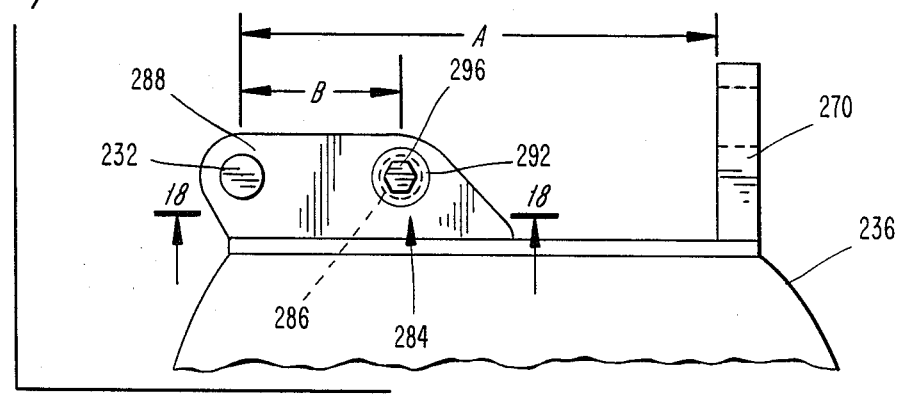
Fig. 12
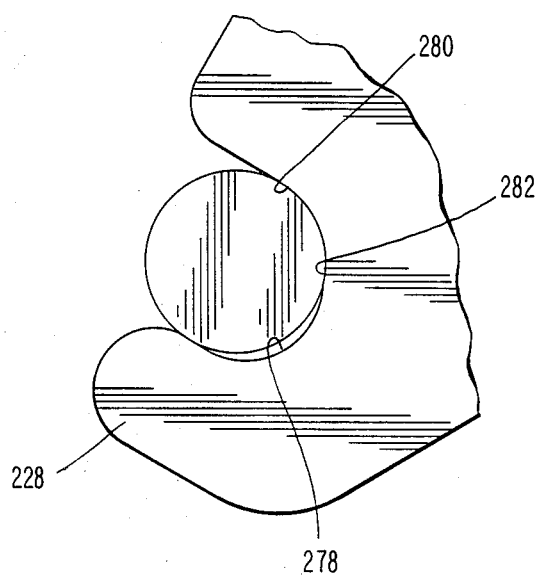
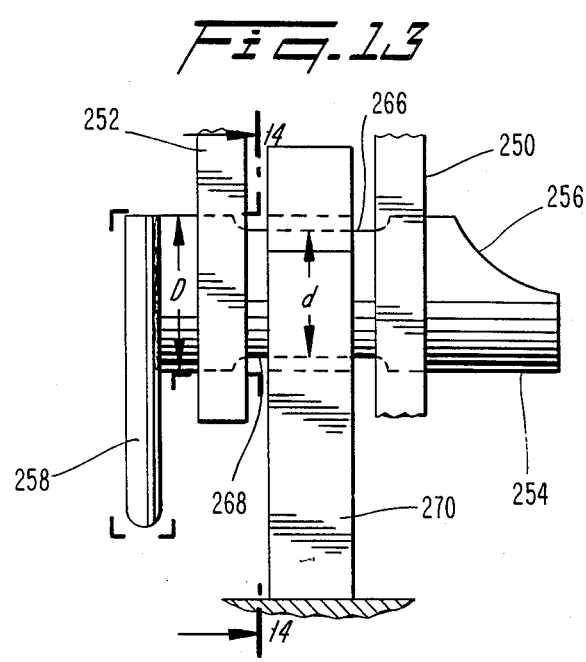
Fig. 13

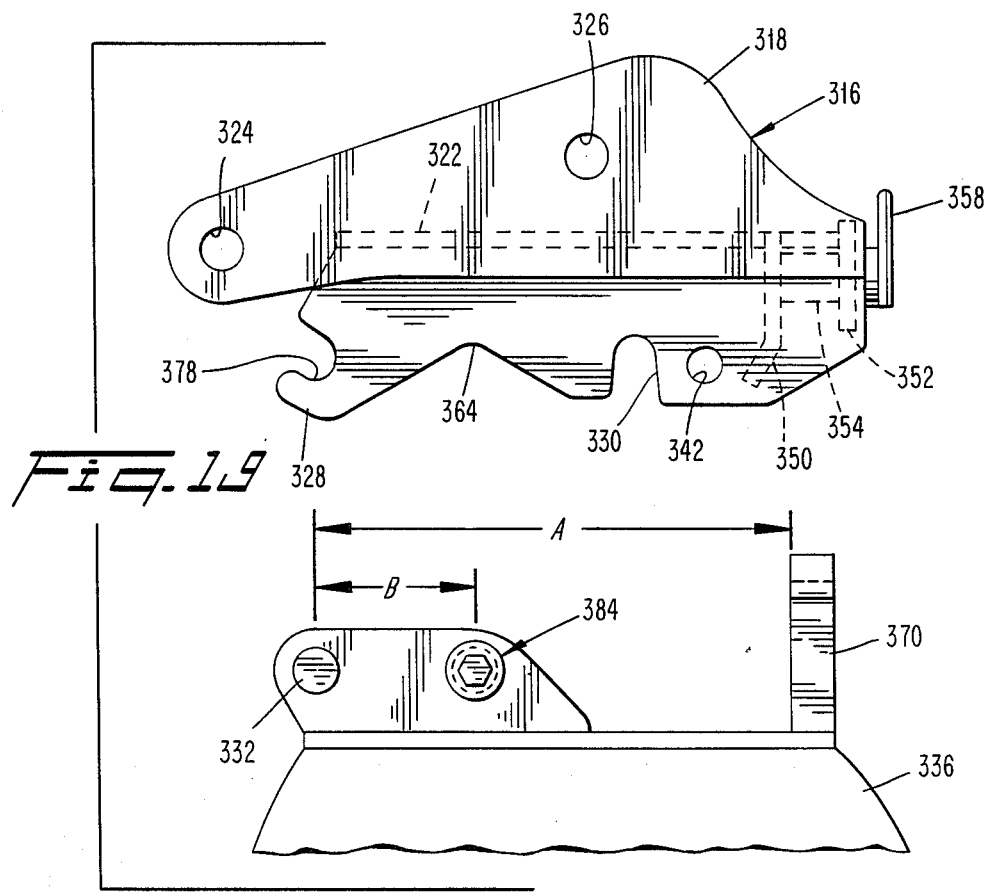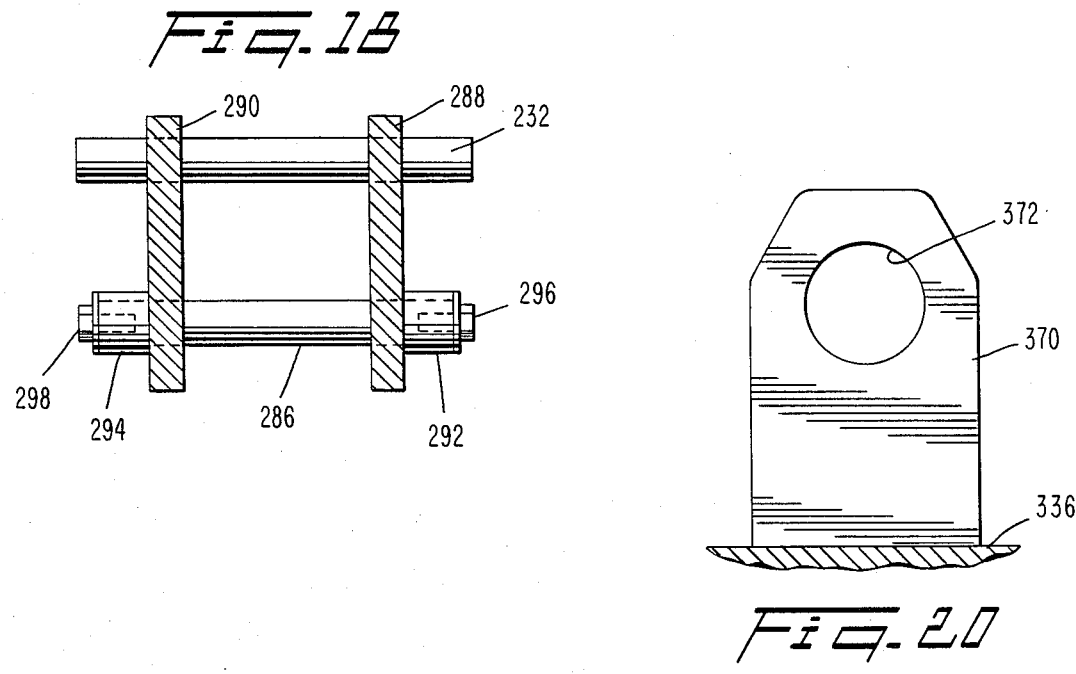

SYSTEM FOR ATTACHING AND LOCKING MATERIAL HANDLING TOOLS TO A DIPPER BOOM

BACKGROUND OF THE INVENTION

The present invention relates to material handling equipment, and, more particularly to an apparatus and method for releasably securing a material handling tool to an arm, such as a dipper boom of a backhoe or loader lift arms of a front loader.

The changing of material handling tools such as buckets, blades, rippers, augers, etc., mounted on an arm such as a dipper boom of a backhoe, has traditionally been difficult and time consuming. In addition, various tools, such as wrenches and hammers, are required to change such material handling tools. In some situations, the changing of a material handling tools requires two people.

A conventional device for mounting a bucket to a backhoe dipper boom includes a pair of coaxial, axially-spaced bores in the bucket and a pair of cylindrical coaxial bosses on the dipper boom that are aligned with the bores in the bucket. Hinge pins extending through the bores and bosses retain the bucket on the boom. U.S. Pat. No. 4,127,203, issued on Nov. 28, 1978, discloses such a mounting device. A disadvantage of such a device is that precise alignment is required between the bores and bosses in order for the hinge pins to be inserted. Furthermore, once the pins are inserted, any forces exerted between the bucket and the boom can cause jamming of the pins. Specifically, it is a common problem in older machines for "hydraulic creep" in the dipper boom to create a downward pressure on the bucket, thus resulting in a binding of the pins.

U.S. Pat. Nos. 3,934,738 and 4,311,428 disclose bucket attachment devices that include a main body connected to a dipper boom. At the forward end of the main body is a hook that engages within a specially designed opening in the bucket. At the rearward end of the main body is a receptacle for receiving a projection extending from the bucket. When the bucket is in place with respect to the main body, a pin may be inserted through the bucket projection and main body receptacle to lock the bucket to the main body. Disadvantages of this system include the fact that the pin may become jammed or lost, and that tools may be required to remove or insert the pin.

U.S. Pat. Nos. 3,606,052 and 4,187,050 disclose quick-disconnect coupling devices for attaching a bucket to a dipper boom. These devices each incorporate a dipper boom attachment that includes a pivoting latch plate that engages with a pin on the bucket to secure the bucket to the dipper boom. Disadvantages of these systems include the fact that the attachment means on the bucket must be specifically sized to the attachment means on the dipper boom, thus reducing versatility of the system.

In fact, it is a common disadvantage of many of the prior art attachment systems that the portion of the system that attaches to the dipper boom is specifically sized to a particular model bucket. For example, the size and location of the pins on the bucket must conform to the attachment device mounted to the dipper boom. Thus, if a backhoe operator wanted to change buckets, it is likely that the attachment device on the dipper boom would likewise need to be replaced. Not only is it typical for a manufacturer to make material handling tools of several different sizes that are not compatible with the same attachment device, but the attachment devices made by one manufacturer are frequently not compatible with material handling tools made by a different manufacturer.

It is a further disadvantage of many of the prior art systems that a portion of the attachment system is integrally connected to either the bucket or the dipper boom. Thus, in the event of a failure of that portion of the system, the entire equipment must be inoperable while the failed portion is repaired.

OBJECTS AND SUMMARY OF THE PRESENT INVENTION

In view of the foregoing limitations and shortcomings of the prior art devices, as well as other disadvantages not specifically mentioned above, it should be apparent that, prior to the present invention, there existed a need in the art for an improved apparatus for connecting a material handling tool to a dipper boom.

It is, therefore, an object of the present invention to provide an apparatus for attaching a material handling tool to a dipper boom that can be easily operated by one operator with no tools.

Another object of the present invention is to provide an apparatus for attaching a material handling tool to a dipper boom that can be mounted on standard O.E.M. (original equipment manufacturer) brackets without any structural modifications to the O.E.M. brackets.

A further object of the present invention is to provide an apparatus for attaching a material handling tool to a dipper boom, such that, in the event of a failure of a component of the apparatus, the apparatus can be removed, and the material handling tool can be secured to the dipper boom in a conventional O.E.M. fashion so that continued use of the material handling tool can be had while the attachment apparatus is being repaired.

It is yet another object of the present invention to provide an apparatus for attaching a material handling tool to a dipper boom, wherein the apparatus is adapted for use with a variety of sizes of material handling tools.

It is still another object of the present invention to provide an apparatus for attaching a material handling tool to a dipper boom, wherein the apparatus is designed to avoid the use of parts that may get jammed or stuck.

A further object of the present invention is to provide an apparatus for attaching a material handling tool to a dipper boom that includes a locking mechanism to prevent the material handling tool from inadvertently becoming detached from the dipper boom.

It is yet another object of the present invention to provide an apparatus for attaching a material handling tool to a dipper boom, wherein the material handling tool can be quickly connected and disconnected from the dipper boom.

It is still yet another object of the present invention to provide an apparatus for attaching a material handling tool to a dipper boom with a rigid connection and with consistent alignment of the attachment with the dipper boom.

It is another object of the present invention to provide an apparatus for attaching a material handling tool to a dipper boom, wherein the apparatus may combine a prior art connecting mechanism with a universal connecting mechanism.

It is still another object of the present invention to provide a method for attaching a material handling tool to a dipper boom that can be easily performed by one operator.

It is yet another object of the present invention to provide a method for attaching a material handling tool to a dipper boom that can be performed without tools.

Briefly described, the present invention relates to a system for attaching a material handling tool to an arm, such as a dipper stick on a backhoe or the loading lift arms of a front loader. The system comprises a bracket, means for mounting the bracket to the arm, forward means on the bracket for engaging with a forward engagement fixture on the material handling tool second means pivotably mounted to the bracket for engaging with a rearward engagement fixture on the material handling tool said second engaging means being pivotable from a first position in which it is positioned to receive the rearward engagement fixture to a second position in which it has engaged the rearward engagement fixture, and locking means rotatably mounted on the bracket, said locking means including a locking pin having a recess formed therein, said locking means located adjacent the second engaging means such that when the locking means is in a first position, a portion of the second engaging means passes within the recess when pivoting from its first position to its second position, and when the locking means is rotated to a second position the locking pin locks the second engaging means in the second engaging means second position.

The invention also relates to a system for attaching a material handling tool to an arm, such as a dipper stick on a backhoe or the loading lift arms of a front loader. The system comprises a bracket, means for mounting the bracket to the arm, a forward engagement fixture mounted on the material handling tool, forward means on the bracket for engaging with the forward engagement fixture on the material handling tool, a rearward engagement fixture mounted on the material handling tool said rearward engagement fixture having an opening therein, rearward means rotatably mounted on the bracket for engaging with the rearward engagement fixture, said rearward engaging means including a locking pin that is substantially cylindrical in one region and irregularly shaped in a second region, said rearward engaging means being located such that when the locking pin is in an unlocked position, the second region of the locking pin fits into the rearward engagement fixture opening, said locking pin and opening being designed such that rotation of the locking pin to a locked position when the locking pin is within the opening prevents separation of the rearward engaging means and the rearward engagement fixture.

The present invention also relates to a material handling tool system comprising a plurality of models of brackets, each of such brackets adapted to be mounted to an arm of excavating equipment such as, or example, a backhoe or a front loader, and each model of said brackets including first means for attaching that model bracket to conventional attachment fixtures on a particular model of a conventional material handling tool a plurality of models of material handling tools, each of said material handling tools including a fixed forward attachment fixture and a rearward attachment fixture, the size and spacing of the forward and rearward attachment fixtures being the same on all models, second means mounted on each of the brackets for attaching the bracket to the fixed forward and fixed rearward attachment fixtures of the plurality of models of material handling tools, whereby any of the models of brackets is usable with a particular conventional material handling tool and with every of the plurality of models of material handling tool having the fixed forward and fixed rearward attachment fixtures.

With the foregoing and other objects, advantages and features of the invention that will become hereinafter apparent, the nature of the invention will be more clearly understood by reference to the following detailed description of the invention, the appended claims and to the several views illustrated in the attached drawings.

BRIEF DESCRIPTION OF THE DRAWINGS

FIG. 4 is a side view of a portion of the attachment mechanism according to the present invention;

FIG. 5 is another side view of a portion of the attachment mechanism according to the present invention;

FIG. 6 is a view in cross section taken along line 6—6 of FIG. 5;

FIG. 7 is a side view of the portion of the attachment mechanism shown in FIG. 5 in locked position;

FIG. 8 is a side view of a portion of a second preferred embodiment of the present invention;

FIG. 9 is a side view of the portion shown in FIG. 8 in locked position;

FIG. 10 is a view in cross section taken along line 10—10 of FIG. 9;

FIG. 11 is a side view of a third preferred embodiment of the present invention;

FIG. 12 is an enlarged detail view of the forward hook of the attachment mechanism shown in FIG. 11;

FIG. 13 is a view of the rear locking mechanism of FIG. in a locked position;

FIG. 18 is a view in cross section taken along line 18—18 of FIG. 11;

FIG. 19 is a side view of a fourth preferred embodiment of the present invention; and FIG. 20 is a view of a portion of the embodiment shown in FIG. 19.

DETAILED DESCRIPTION OF THE PREFERRED EMBODIMENTS

Figure 1:
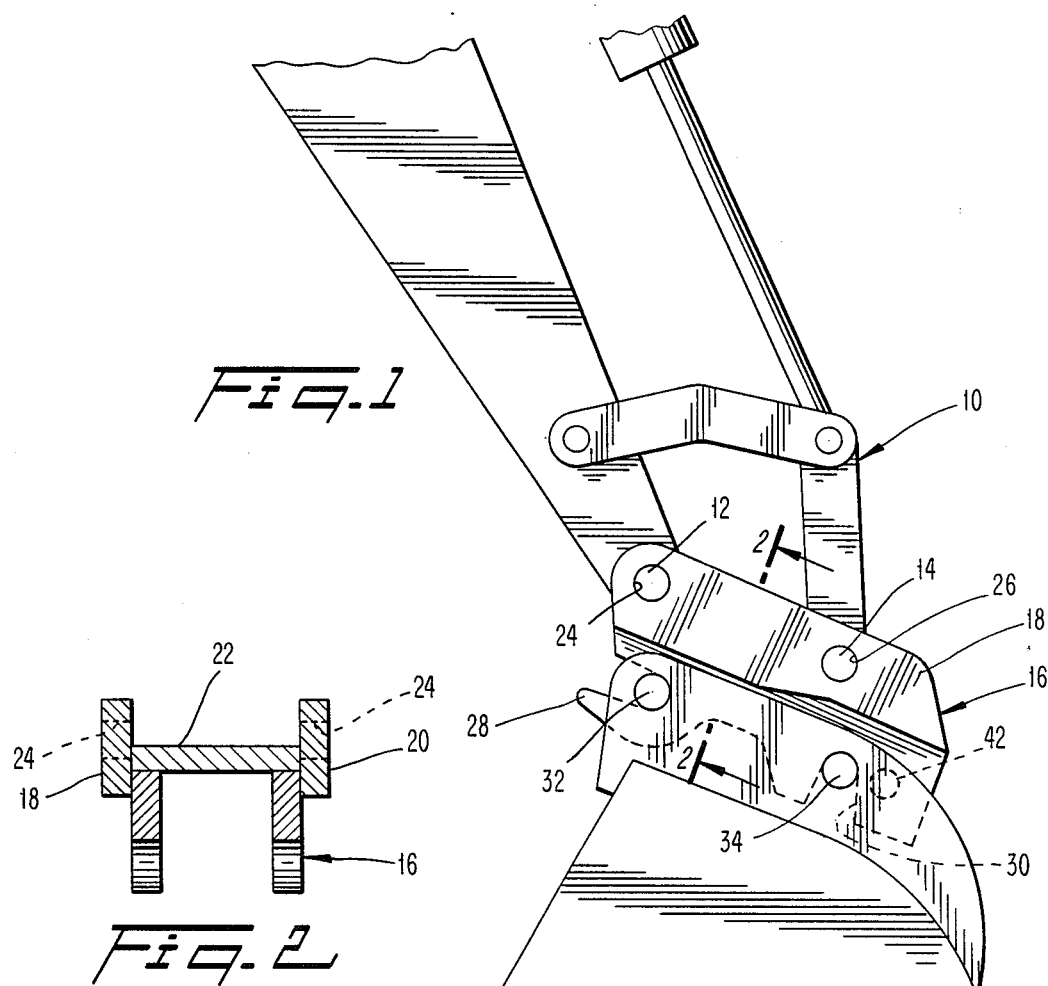
FIG. 1 is a side view of a portion of a first preferred embodiment of the attachment mechanism according to the present invention, shown together with the lower end of a dipper boom and a bucket.
Figure 2:
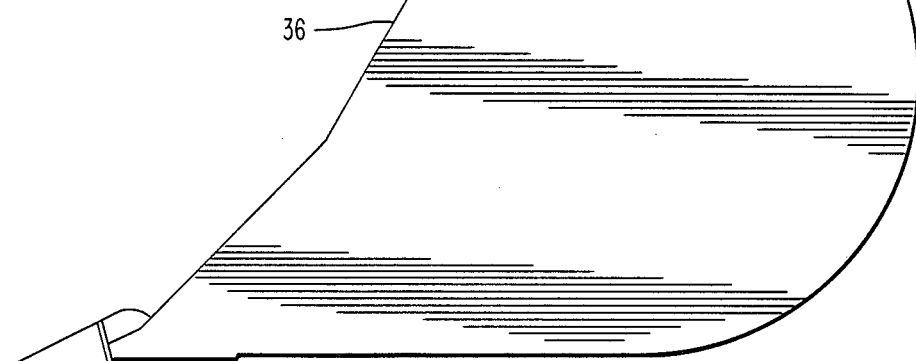
FIG. 2 is a view in cross section taken along line 2—2 of FIG. 1.

With reference to FIG. 1, a bucket 36 is mounted to the lower portion of a dipper boom 10 of, for example, a backhoe (not shown). The lower portion of the dipper boom 10 includes bores (not shown) through which bores, pins 12, 14 are inserted. With reference to FIGS. 1 and 2, a bracket 16 includes spaced parallel plates 18, 20, which are interconnected by a perpendicular plate 22. The pins 12, 14 of the dipper boom 10 fit through bores 24, 26 in the parallel plates 18, 20 and retain the bracket 16 to the dipper boom 10. The dipper boom 10 fits between the plates 18, 20. The spacing of the bores 24, 26 and the distance between the plates 18, 20 are preferably determined in accordance with O.E.M. (original equipment manufacturer) standards.

The bracket 16 includes a forward hook 28 and a rearward recess 30 on the lower end of the plates 18, 20. The forward hook 28 and the rearward recess 30 engage with pins 32, 34 of the bucket 36. It should be understood that the bracket 16 may also be used to engage with various kinds of other material handling tools such as frost rippers, forks, etc. The spacing of the forward hook 28 and the rearward recess 30 must conform to the pin arrangement of the particular material handling tool intended to be used with the bracket 16.

To engage the bracket 16 with the bucket 36, the operator first engages the hook 28 with the pin 32 and then further lowers the dipper boom 10 until the pin 34 is received within the rearward recess 30 of the bracket 16.

Figure 3:
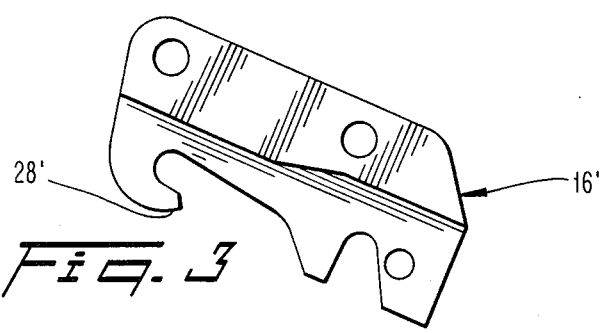
FIG. 3 is a side view of a modified portion of the portion of the present invention shown in FIG. 1.
Figure 14:
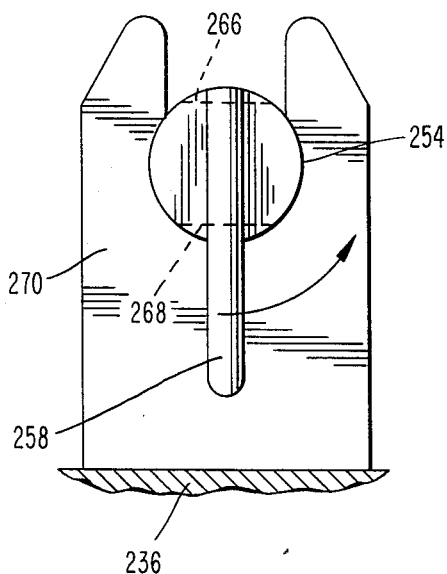
FIG. 14- is a view in cross section taken along line 14—14 in FIG. 13.

With reference to FIG. 3, it should be noted that the forward hook 28' of the bracket 16' can face in a rearward direction as an alternative to the hook 28 shown in FIG. 1.

With reference to FIGS. 4-5 and 7, a locking element 38 is pivotally mounted to the bracket 16 by means of a pin 40 inserted through bore 42 in the bracket 16. As the bracket 16 is lowered onto the bucket 36, the pin 34 of the bucket 36 contacts a first arm 44 of the locking element 38, causing the locking element 38 to pivot about the pin 40 until the pin 34 of the bucket 36 is completely within a recess 46 of the locking element 38. When the bracket 16 is in an engaged position with respect to the bucket 36, a second arm 48 of the locking element 38 retains the pin 34 within the recess 46.

Supports 50, 52 are mounted to the perpendicular plate 22 of the bracket 16. The supports 50, 52 rotatably support a locking pin 54. The locking pin 54 is substantially cylindrical in shape, with the exception of an arc-shaped recess 56 that is formed in a section of the locking pin 54 between the two supports 50, 52. A handle 58 is provided at one end of the locking pin 54 so that the handle 58 may be easily accessed by an operator or by automated equipment controlled by the operator.

A heel 60 is provided at one end of the locking element 38. When the locking pin 54 is in its "unlocked" position, as shown in FIG. 5, the heel 60 pivots freely within the arc-shaped recess 56 of the locking pin 54.

When the bracket 16 is in an engaged position with respect to the bucket 16, the locking pin 54 may be placed in its "locked" position by rotating the pin 180°. When the locking pin 54 is in its "locked" position, as shown in FIG. 7, the heel 60 of the locking element 38 engages with the cylindrical surface of the locking pin 54 and prevents the locking element 38 from pivoting. In the "locked" position, the pin 34 of the bucket 36 is caught within the recess 46 of the locking element 38 by the second arm 48 of the locking element. This arrangement prevents the detachment of the bucket 36 from the dipper boom 10. The arc-shaped recess 56 of the locking pin 54 should include a radius "P" that accommodates a radius "L" traced by the heel 60 during pivoting of the locking element 38.

With reference to FIG. 6, the heel 60 of the locking element 38 may include a contour 62 to accommodate the cylindrical surface of the locking pin 54.

To disengage the bucket 36 from the dipper boom 10, the locking pin 54 is rotated 180° to its unlocked position, as shown in FIG. 5. The locking element 38 is thus able to pivot about the pin 40, which enables the bucket pin 34 to be released from the recess 46 of the locking element. With the bucket pin 34 released, the bracket 16 may be lifted up from the bucket 36.

Although reference is made to a dipper boom of a backhoe, it should be clear that all embodiments of the present invention are intended to be used on an arm of any kind of excavating equipment, including but not limited to the dipper stick of a backhoe or the loading lift arms of a front loader.

Turning attention to FIGS. 8-10, a second preferred embodiment of the present invention is illustrated. The second preferred embodiment of the present invention includes a locking element 138 and a locking pin 154 that may be incorporated onto a bracket 16, 16' of the types illustrated in FIGS. 1-3.

With reference to FIGS. 8 and 9, the locking element 138 is pivotally mounted to the bracket 16 by means of a pin 140 that is retained within the bore 42 of the bracket 16. The locking element 138 pivots about the pin 140.

The locking element 138 includes a first arm 144 that contacts the pin 34 of the bucket 36 as the bracket 16 is lowered onto the bucket 36. The contact between the bucket pin 34 and the locking element first arm 144 causes the locking element 138 to pivot about the pin 140 until the bucket pin 34 is completely within a recess 146 of the locking element 138. A second arm 148 of the locking element 138 retains the pin 34 within the recess 146 of the locking element 138.

Supports 150, 152 are mounted to the perpendicular plate 22 of the bracket 16. A locking pin 154 is rotatably supported within the brackets 150, 152. The locking pin 154 is substantially cylindrical in shape, with the exception of an arc-shaped recess 156 formed at one end of the locking pin 154. A handle 158 may be provided at the opposite end of the locking pin 154 in such a way that the handle 158 may be easily accessed by an operator or by automated equipment controlled by the operator.

The locking element 138 includes a heel 160 that moves within a radius "L" of the pin 140. When the locking pin 154 is in its "unlocked" position, i.e., with the arc-shaped recess 156 facing the locking element 138, as shown in FIG. 8, the heel 160 passes freely within the arc-shaped recess 156 of the locking pin 154. As such, the locking element 138 is able to pivot so as to engage or release the pin 34 of the bucket 36.

When the bucket 16 is in an engaged position with respect to the bucket 36, the locking pin 154 may be placed in its "locked" position by rotating the locking pin 180° to its "locked" position, i.e., with the arc-shaped recess 156 facing away from the locking element 138, as shown in FIG. 9. When the locking pin 154 is in its locked position, the heel 160 of the locking element 138 engages with the cylindrical surface of the locking pin 154 so as to prevent pivoting of the locking element 138 about the pin 140.

With reference to FIG. 10, the heel 160 of the locking element 138 may include a contour 162 to accommodate the cylindrical surface of the locking pin 154.

A problem with many of the prior art designs, and even with the embodiments of the present invention disclosed above, is that the spacing between the pins on the material handling tools, such as, for example, the pins 32, 34 on the bucket 36 may vary on models from different manufacturers and even among different models of the same manufacturer. In addition, even the diameters of the bucket pins are not standardized. As a result, with such attachment devices, a different size bracket must be used for each bucket having different pin sizes or spacing.

In accordance with a third preferred embodiment of the present invention, a system for standardizing the attachment mechanism is provided. With reference to FIG. 11, a bracket 216 in accordance with the third preferred embodiment includes two parallel plates 218, only one of which is shown in FIG. 11. The two parallel plates 218 are interconnected by a perpendicular plate 222.

The bracket 216 is mounted to a dipper boom by inserting pins (not shown) through bores (not shown) in the dipper boom and through bores 224, 226 in the bracket 216. The bracket 216 also includes a forward hook 228 and a rearward recess 230 for engaging with pins on a bucket. A locking element, such as the locking element 138 of the second preferred embodiment may be mounted to the bracket 216 with a pin inserted through bore 242. See FIG. 8 for an illustration of the locking mechanism. In such a case, the bracket 216 may be used in the same manner that either the first or second preferred embodiments are used.

In order that the bracket may be used with buckets of different sizes, the bracket 216 includes a universal mounting system that includes supports 250, 252 mounted to the perpendicular plate 222 of bracket 216. A rear locking pin 254 is rotatably supported in the supports 250, 252 and includes a handle 258 that is easily accessible by an operator or by automated equipment controlled by an operator.

Figure 15:
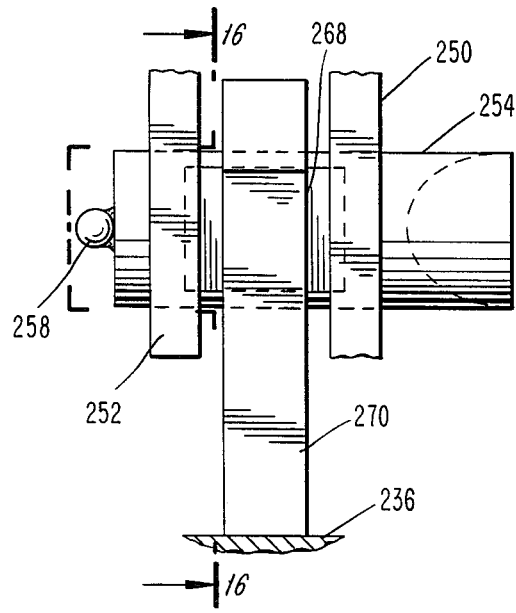
FIG. 15 is a view of the rear locking mechanism of FIG. 11 in an unlocked position.

With reference to FIGS. 13 and 15, the locking pin 254 is substantially cylindrical in shape except that in a region between the supports 250, 252, the locking pin 254 includes two parallel flat surfaces 266, 268. The distance "d" between the two parallel flat surfaces 266, 268 is less than the overall diameter "D" of the locking pin 254.

A bucket 236 employing the universal mounting system of the third embodiment of the present invention includes a fixed forward pin 232 for engaging with the forward hook 228 of the bracket 216. The bucket 236 also includes a fixed rear locking lug 270 for engaging with the locking pin 254.

Figure 17:
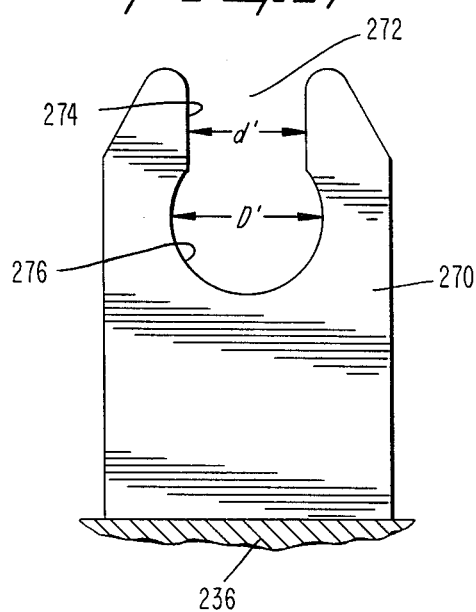
FIG. 17 is a view of a portion of the rear locking mechanism of FIG. 11.

With reference to FIG. 17, the lug 270 comprises a flat plate having an opening 272 formed therein. The opening 272 includes a gate 274 having a width d' that is slightly larger than the distance d between the two parallel flat surfaces 266, 268 of the locking pin 254, but is smaller than the diameter D of the locking pin 254. The opening 272 also includes a substantially circular aperture 276 having a diameter D' that is slightly larger than the diameter D of the locking pin 254.

The forward hook 228 and the locking pin 254 of the bracket 216 are spaced from each other by a distance A, which is equal to the distance between the fixed forward pin 232 on the bucket 236 and the fixed rear locking lug 270 on the bucket 236.

Figure 16:
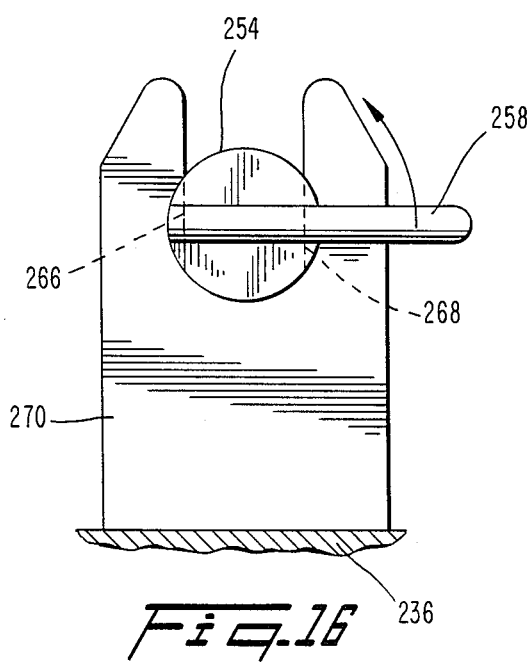
FIG. 16 is a view in cross section taken along line 16—16 of FIG. 15.

To mount the bucket 236 to a dipper boom on which the bracket 216 is attached, the locking pin 254 is rotated to its unlocked position. In the unlocked position, the two parallel, flat surfaces 266, 268 are parallel with the plates 218 of the bracket 216. The forward hook 228 is then engaged with the fixed forward pin 232 of the bucket 236. The rearward end of the bracket 216 is then lowered onto the bucket 236 such that the flat surfaces 266, 268 of the locking pin 254 pass through the gate 274 of the opening 272 into the circular aperture 276 of the fixed rear locking lug 270, as seen in FIGS. 15 and 16.

The locking pin 254 is then rotated 90° to the locked position. In the locked position, the two parallel, flat surfaces 266, 268 are perpendicular to the plates 218 of the bracket 216, and the locking pin 254 cannot pass through the gate 274 because the width d' of the gate 274 is smaller than the diameter D of the locking pin 254. The locking pin 254 is then secured within the fixed rear locking lug 270. With the locking pin 254 secured within the fixed rear locking lug 270, the bracket 216 and the dipper boom are firmly attached to the bucket 236.

In accordance with the universal mounting system of the present invention, the distance between the forward hook 228 and the rear locking pin 254 is the same on all models of the bracket 216. However, the distance between the forward hook 228 and the rearward recess 230 may vary between models in order to accommodate different pin spacings on different prior art buckets. Thus, a manufacturer may produce a line of brackets 216 each having a different spacing between the forward hook 228 and the rearward recess 230 for use with a particular prior art bucket. The manufacturer may also produce a line of buckets 236, each having a fixed forward pin 232 and a fixed rear locking lug 270, which are always separated by the same distance A. However, since the spacing between the forward hook 228 and the locking pin 254 is the same on each model of the bracket 216, each model of bracket 216 made in accordance with the system is usable with every bucket also made in accordance with the system.

Therefore, an end user need only buy one bracket 216 which can then be used with every model of material handling equipment produced by the same manufacturer. It is possible, however, that a manufacturer may sell different models of the bracket 216, with different spacing between the forward hook 228 and the rearward recess 230 in order to accommodate various models of material handling tools made by other manufacturers.

Since the diameters of the pins of material handling equipment such as the pins 32, 34 of bucket 36, may vary among manufacturers, the forward hook 228 is designed so as to accommodate pins of different diameters. With reference to FIG. 12, the mouth of the hook 228 is designed to accommodate the largest diameter of pin that could be reasonably expected. In order to adequately retain a pin of smaller diameter, the hook 228 is formed with a slight depression 278 at the bottom thereof. Thus, the smaller diameter pins fit within the depression 278.

When the hook 228 is used to engage a small diameter pin, the pin is supported only by the bottom of the hook 228. The top 280 and the side 282 of the hook 228 provide no support for the smaller diameter pins. Such an arrangement would provide a loose connection between the bracket 216 and a material handling attachment having a small diameter pin. To avoid such a loose connection, a fulcrum point 284 is provided on the bucket 236.

With reference to FIGS. 11 and 18, the fulcrum point 284 includes a pin 286 extending through bores in side plates 288, 290 of the bucket 236. An eccentric sleeve 292, 294 is rotatably mounted on the ends of the pin 286 that protrude beyond the side plates 288, 190. Bolts 296, 298 are used to fix the orientation of the sleeves 292, 294 with respect to the pin 286.

The bracket 216 is also provided with a contour 264 in the parallel plates 218. The contour 264 is preferably arranged between the forward hook 228 and the rearward recess 230, and is preferably arranged the same distance B from the forward hook 228 on all models of the bracket 216. The fulcrum point 284 of each model of bucket 236 is also always preferably arranged the same distance B from the fixed forward pin 232 on all models of material handling tools. Thus, the fulcrum point 284 of each bucket 236 made in accordance with the third embodiment of the present invention will fit within the contour 264 of each bracket 216.

In practice, when the bracket 216 is to be used with a bucket 236 having a relatively large fixed forward pin 232, the eccentric sleeves 292, 294 would be rotatably adjusted such that the thin portion of the sleeve would be facing the contour 264. When the bracket 216 is to be used with a bucket 236 having a relatively thin fixed forward pin 232, the eccentric sleeves 292, 294 should be rotated such that the thick portion of the sleeve will face the contour 264. In such a position, the fulcrum point 284 will cooperate with the contour 264 to prevent any looseness in the connection between the bracket 216 and the bucket 236.

The bracket 216 may be used with a locking mechanism, such as the locking mechanism of the first or second preferred embodiments, or it may be used without such a mechanism. In either event, the presence of such a locking mechanism, will not interfere with the use of the rear locking pin 254, and thus does not need to be removed if the rear locking pin 254 is used. In fact, the rear locking pin 254 may be provided with a recess 256 to enable pivoting of a locking mechanism, such as the locking element 138 of the second preferred embodiment. In such a case, the locking pin 254 is also able to lock the locking element 138 by engaging the heel 160 of the locking element 138 when the locking pin 254 is rotated to its locked position.

Accordingly, the third embodiment of the present invention provides a quick changing mechanism that can accommodate a specifically sized prior art material handling tool, but is also able to be connected to an entire line of material handling tools made in accordance with the present invention.

With reference to FIGS. 19 and 20, a fourth preferred embodiment of the present invention includes a bracket 316 having two bores 324 and 326, by which the bracket may be mounted to a dipper boom by means of pins (not shown). The bracket 316 further includes a forward hook 328 for engaging with a pin 332 on a bucket 336. The hook 328 includes a slight depression 378 at the base thereof for accommodating pins 332 of a smaller diameter, as described above with respect to the third preferred embodiment.

The bracket 316 includes a contour 364 and the bucket 336 includes a fulcrum point 384 that operate and cooperate in the manner described above with respect to the contour 264 and the fulcrum point 284 of the third preferred embodiment.

The bracket 316 further includes a bore 342 and a rearward recess 330 for accommodating a locking mechanism, such as the locking mechanism 38 or 138 of the first and second preferred embodiments.

Supports 350, 352 are mounted on a plate 322 of the bracket 316, which plate 322 extends perpendicularly to the walls 318 of the bracket 316. A pin 354 is removably supported within the supports 350, 352. Mounted on the bucket 336 is a rear mounting lug 370, which includes an opening 372 extending therethrough. The lug 370 is designed to fit between the supports 350, 352 when the pin 354 is removed.

The bracket 316 may thus be attached to a bucket 336 by engaging the forward hook 328 with the fixed forward pin 332, and, when the pin 354 is removed, inserting the lug 370 into the space provided between the supports 350, 352. The bucket 336 may then be locked to the bracket 316 by inserting the pin 354 through the opening 372 of the lug 370 and through the supports 350, 352. A handle 358 may be provided on the pin 354 in such a way that the handle 358 may be easily accessed by an operator or by automated equipment controlled by the operator.

By maintaining the distance A between the forward hook 328 and the supports 350, 352 constant on all models of the brackets 316, and by maintaining the distance B between the forward hook 328 and the contour 364 constant, the bracket 316 may be universally used with any material handling tool having a pin 332, a fulcrum point 384 a fixed distance B from the pin 332, and a rear lug 370 a fixed distance A from the pin 332.

As with the third preferred embodiment, by varying the location of the rearward recess 330 on the bracket 316, the bracket 316 may be adapted to fit with a specific conventionally attached material handling tool while still maintaining its ability to be attached to a bucket 336 having the universal attachment features.

Although only preferred embodiments are specifically illustrated and described herein, it will be appreciated that many modifications and variations of the present invention are possible in light of the above teachings and within the purview of the appended claims without departing from the spirit and intended scope of the invention. In particular, it should be clear that the present invention is intended to be used on many types of equipment, including but not limited to backhoes, front loaders, and other excavating apparatus.

What is claimed is:

1. A system for attaching a material handling tool to an arm, comprising:
   a bracket;
   means for mounting the bracket to the arm;
   forward means on the bracket for engaging with a forward engagement fixture on the material handling tool;
   second means pivotably mounted to the bracket for engaging with a rearward engagement fixture on the material handling tool, said second engaging means being pivotable from a first position in which it is positioned to receive the rearward engagement fixture to a second position in which it has engaged the rearward engagement fixture; and
   a substantially cylindrical locking pin rotatably mounted on the bracket, said locking pin having a recess formed therein and being located adjacent the second engaging means such that when the locking pin is in an unlocked position a portion of the second engaging means passes within the recess of the locking pin when the second engaging means is pivoting from its first position to its second position, and when the locking pin is rotated to a locked position the locking pin locks the second engaging means in its second position.

2. The system of claim 1, wherein the recess is provided at one end of the locking pin.

3. The system of claim 1, wherein the recess is provided at a central portion of the locking pin.

4. The system of claim 1, wherein the bracket includes a rearward recess for accommodating the rearward engagement fixture when the material handling tool is attached to the bracket.

5. The system of claim 1, wherein the second engaging means includes a heel that pivots through a radius as the second engaging means pivots from its first position to its second position, said heel including a contour for engaging with the locking pin when the second engaging means and the locking pin are in their second and locked positions, respectively.

6. The system of claim 1, wherein the forward engaging means and the second engaging means are adapted to engage with the forward engagement fixture and the rearward engagement fixture in the form of parallel, spaced pins on the material handling tool.

7. The system of claim 1, wherein the locking pin includes a handle mounted at one end thereof.

8. A method of attaching a material handling tool to an arm having a bracket mounted thereon, comprising the steps of:
   rotating a substantially cylindrical locking pin having a recess therein and mounted on the bracket to an unlocked position;
   engaging a forward hook on the bracket with a forward engagement fixture on the material handling tool;
   lowering the bracket onto the material handling tool such that a rearward engagement fixture on the material handling tool engages with a latch mechanism on the bracket, causing the latch mechanism to rotate from a first position to a second position wherein the rearward engagement fixture is engaged with the latch mechanism, whereby a portion of the latch mechanism passes through the recess in the locking pin when the latch mechanism rotates from the first position to the second position; and
   rotating the pin to a locked position, whereby the latch mechanism is locked in its second position.

9. A method of attaching a material handling tool to an arm having a bracket mounted thereon, comprising the steps of:
   rotating a locking pin having a recess therein and mounted on the bracket to an unlocked position;
   engaging a forward hook on the bracket with a forward engagement fixture on the material handling tool;
   lowering the bracket onto the material handling tool such that a rearward engagement fixture on the material handling tool engages with a latch mechanism on the bracket, causing the latch mechanism to rotate from a first position to a second position wherein the rearward engagement fixture is engaged with the latch mechanism, whereby a portion of the latch mechanism passes through the recess in the locking pin when the latch mechanism rotates from the first position to the second position; and
   rotating the pin to a locked position, whereby the latch mechanism is locked in its second position;
   wherein when the locking pin is in its unlocked position, the recess is on the side of the locking pin facing the latch mechanism and when the pin is in its locked position the recess is facing away from the latch mechanism.

10. A system for attaching a material handling tool to an arm, comprising;
   a bracket;
   means for mounting the bracket to the arm;
   a forward engagement fixture mounted on the material handling tool;
   forward means on the bracket for engaging with the forward engagement fixture on the material handling tool;
   a rearward engagement fixture on the material handling tool having an opening therein;
   rearward means rotatably mounted on the bracket for engaging with the rearward engagement fixture, said rearward engaging means including a locking pin that is substantially cylindrical in one region and noncylindrically shaped in a second region;
   said rearward engaging means being located such that when the locking pin is in an unlocked position, the second region of said locking pin fits into the rearward engagement fixture opening;
   said locking pin and opening being designed such that rotation of the locking pin to a locked position when the locking pin is within the opening prevents separation of the rearward engaging means and the rearward engagement fixture; and
   means on the bracket for engaging with a pin, spaced from the forward engagement fixture, such that the bracket may engage with either the material handling tool by means of the forward and rearward engaging means or with an alternative material handling tool by means of the forward engaging means and the pin engaging means.

11. The system of claim 10, wherein the opening includes a gate of a first width and a main portion of a second width that is wider than the first width.

12. The system of claim 11, wherein the second region of the locking pin has a width along a first dimension that is narrower than the first width and a width along a second dimension that is wider than the first width and narrower than the second width.

13. The system of claim 10, further including two spaced supports for rotatably supporting the locking pin, and said rearward engagement fixture comprises a plate that fits between the two spaced supports.

14. The system of claim 10, wherein the pin engaging means is arranged between the forward engaging means and the rearward engaging means.

15. The system of claim 10, wherein the pin engaging means comprises:
   latch means for engaging the pin, said latch means being pivotally mounted to the bracket so as to be pivotable from a first position in which it is positioned to receive the pin to a second position in which it has engaged the pin.

16. The system of claim 15, wherein said locking pin includes a recess at one end thereof and said locking pin is adjacent the latch mean such that when the locking pin is in its unlocked position a portion of the latch means passes within the recess when pivoting from its first position to its second position, and when the locking pin is rotated to its locked position, the locking pin locks the latch means in its second position.

17. A system for attaching a material handling tool to an arm, comprising;
   a bracket;
   means for mounting the bracket to the arm;

a forward engagement fixture mounted on the material handling tool;

forward means on the bracket for engaging with the forward engagement fixture on the material handling tool;

a rearward engagement fixture on the material handling tool having an opening therein;

rearward means rotatably mounted on the bracket for engaging with the rearward engagement fixture, said rearward engaging means including a locking pin that is substantially cylindrical in one region and noncylindrically shaped in a second region;

said rearward engaging means being located such that when the locking pin is in an unlocked position, the second region of said locking pin fits into the rearward engagement fixture opening;

said locking pin and opening being designed such that rotation of the locking pin to a locked position when the locking pin is within the opening prevents separation of the rearward engaging means and the rearward engagement fixture;

adjustable fulcrum means mounted on the material handling tool for contacting the bracket; and contour means on the bracket for contacting the adjustable fulcrum means;

wherein the distance from the top of the adjustable fulcrum means to material handling tool is adjustable to prevent rocking between the bracket and the material handling tool.

18. The system of claim 17, wherein the adjustable fulcrum means comprises:

a fulcrum pin mounted on the material handling tool;

an eccentric sleeve mounted on each end of the fulcrum pin; and means for securing the eccentric sleeves to the fulcrum pin.

19. An attachment device for an arm of an excavating device, comprising:

a bracket;

means for mounting the bracket to the arm;

first attachment means on the bracket for attaching the bracket to a pair of parallel, spaced pins on a first material handling tool said first attachment means including a forward hook for engaging one of said parallel, spaced pins and a second means for engaging the other of said parallel, spaced pins;

second attachment means on the bracket for attaching the bracket to a second material handling tool having a fixed forward pin and a fixed rearward lug, said second attachment means including the forward hook and a rearward means for engaging the fixed rearward lug;

wherein the bracket is attachable to only one of the first and second material handling tools at a time.

20. The device of claim 19, wherein the rearward engaging means includes a pin that fits within an opening in the fixed rearward lug when the pin is oriented in a first position, said pin locking within the lug when it is rotated to a second position.

21. A material handling tool attachment system, comprising:

a plurality of models of brackets, each of said brackets adapted to be mounted to an arm of an excavating device, and each model of said brackets including first forward and first rearward means for attaching that model bracket to conventional forward and rearward attachment fixtures on a particular model of a conventional material handling tool;

a plurality of models of material handling tools, each of said material handling tools including a fixed forward attachment fixture and a fixed rearward attachment fixture, the size and spacing of the forward and rearward attachment fixtures being the same on all models;

second means mounted on each of the models of brackets for attaching the bracket to the fixed rearward attachment fixtures of the plurality of models of material handling tools, said first forward attaching means including means for engaging the fixed forward attachment fixture of the plurality of models, said first forward attaching means and said second attaching means being spaced the same as the spacing of the fixed forward attachment fixture and the fixed rearward attachment fixture on the plurality of models, said second attaching means being a different element than said first rearward attaching means and the distance between the second attaching means and the first forward attaching means being different than the distance between the first rearward attaching means and the first forward attaching means;

whereby any of said models of brackets is usable with a particular conventional material handling attachment by means of the first forward and first rearward attaching means and with each of the plurality of models of material handling tools having the fixed forward and fixed rearward attachment fixtures by means of the first forward attaching means and the second attaching means.

22. The system of claim 21, wherein the first forward attaching means comprises a forward hook and the second attaching means comprises a rotatably mounted pin having a noncylindrically shaped surface for mating with and locking to the fixed rearward attachment fixture, said fixed rearward attachment fixture comprising a lug having a slot extending therein and an increased aperture at the end of the slot.

23. The system of claim 21, wherein the second attaching means comprises a pin removably mounted to the bracket and adapted to be inserted into an opening within said fixed rearward attachment fixture.

24. A system for attaching a material handling tool to an arm, comprising:

a bracket;

means for mounting the bracket to the arm;

forward means on the bracket for engaging with a forward engagement fixture on the material handling tool;

second means pivotably mounted to the bracket for engaging with a second engagement fixture on the material handling tool, said second engaging means being pivotable from a first position in which it is able to receive the second engagement fixture to a second position in which it is engaged with the second engagement fixture;

said second engaging means including a pivot point at a central location thereof, through which pivot point said second engaging means is mounted to said bracket;

locking means mounted on the bracket for locking said second engaging means in its second position, said locking means being rotatable from a locked position wherein said locking means contacts said second engaging means so as to retain the second engaging means in its second position to an unlocked position wherein said second engaging means may pivot between its first and second positions;

said second engaging means including a first contact surface for contacting the second engagement fixture and a second contact surface for contacting the locking means when said second engaging means and said locking means are in their second and locked positions, respectively, said first and second contact surfaces being arranged on opposite sides of said pivot point;

wherein said bracket includes a recess for accommodating the second engagement fixture.

25. The system of claim 24, wherein said second contact surface and said locking means are rearward of said pivot point.

26. The system of claim 24, wherein said locking means is mounted at the rearward edge of said bracket.

27. The system of claim 24, wherein said first contact surface is forward of said pivot point and said second contact surface is rearward of said pivot point.

28. The system of claim 27, wherein said locking means is mounted rearward of said pivot point.

* * * * *